United States Patent [19]
Eicher et al.

[11] Patent Number: 5,404,983
[45] Date of Patent: Apr. 11, 1995

[54] TURN-ACT MULTIACTION DEVICE

[76] Inventors: Fred C. Eicher, 5802 Timber Ridge Dr., Prospect, Ky. 40059; Charles F. Evans, Jr., 14411 Lake Forest Dr., Louisville, Ky. 40243; Gary M. Rumrill, 6801 Switch Bark Ct., Louisville, Ky. 40228

[21] Appl. No.: 990,057

[22] Filed: Dec. 14, 1992

[51] Int. Cl.⁶ ............................................. F16D 71/00
[52] U.S. Cl. .......................................... 192/143; 92/2; 92/13.3; 92/62; 92/66; 92/117 R; 92/165 R; 192/139
[58] Field of Search ................ 192/143, 138, 139; 74/479 R; 92/2, 13.3, 62, 66, 117 R, 165

[56] References Cited
U.S. PATENT DOCUMENTS

| | | | |
|---|---|---|---|
| 3,717,231 | 2/1973 | Kaufeldt | 192/143 X |
| 3,823,651 | 7/1974 | Ogilvie | 92/2 |
| 4,493,245 | 1/1985 | Kirsch et al. | 92/2 |
| 4,508,015 | 4/1985 | Lin | 92/2 |
| 4,509,408 | 4/1985 | Kuroda | 92/2 |
| 4,557,746 | 12/1985 | Braithwaite et al. | 92/2 X |
| 4,639,169 | 1/1987 | Becker et al. | 92/13.3 X |
| 4,641,737 | 2/1987 | Gillingham et al. | 192/138 X |
| 4,648,467 | 3/1987 | Ahtola et al. | 92/2 X |
| 4,665,558 | 5/1987 | Burke | 92/2 X |
| 4,824,255 | 4/1989 | Wohlrab | 92/2 X |
| 4,829,880 | 5/1989 | Lieberman | 92/117 R X |
| 4,838,403 | 6/1989 | Layer | 192/139 X |
| 4,858,481 | 8/1989 | Abraham | 192/143 X |

Primary Examiner—Leslie A. Braun
Assistant Examiner—Andrea Pitts
Attorney, Agent, or Firm—Edward M. Steutermann

[57] ABSTRACT

A multi directional actuator capable of moving a shaft in at least two directions independently including one linear and one rotary movement. A base plate is provided to receive a first actuator having a linearly moving shaft which is extended from and retracted into the actuator. A second actuator is connected for movement by the first actuator and where the second actuator operates an output shaft which is selectively rotated through a portion of an arc. A guide arrangement is provided to direct movement of the second actuator by the first actuator and to journal the shaft of the second actuator to prevent orbiting and deflection of the shaft of the second actuator. Limit switches can be provided to indicate end of the stroke of the linear and rotary actuators and the first and second actuators can be separated to allow use of limit stops to limit rotation of the shaft of the second actuator.

13 Claims, 2 Drawing Sheets

TURN-ACT MULTIACTION DEVICE

BACKGROUND OF THE INVENTION

The present invention relates to multiple movement actuators and more particularly relates to actuator combinations to selectively provide rotary and linear movement of an output shaft. Multiple movement actuation devices are used in a wide variety of industrial and other applications and are used is many robotic type devices.

Multimotion actuator devices are known in the art but in general are interrelated or articulated single action devices which have been connected by various means. In general, because of the way such devices have been devised and fabricated they are inherently unstable and in many cases unsatisfactory for many of the applications where devices within the scope of the present invention can be applied.

Additionally, the prior art devices do not provide many of the advantages of devices within the scope of the present invention. In many cases the prior art devices do not provide the advantageous features of devices within the scope of the present invention because the prior art devices are structurally incapable of providing the features.

More particularly, no prior art device is known which can successfully provide independent linear and rotary motion, either simultaneously or in sequence, where orbiting and deflection of the outboard shaft are controlled throughout the rotary and linear travel.

Additionally, no presently available device is known which allows the speeds of both linear and rotary travel available with devices within the scope of the present invention.

Of the utmost importance is the fact that virtually all prior art devices have inherent loss of motion or "free play" which is a severe disadvantage in applications such as robotics where precise positioning is a necessity. The need to compensate for the lack of precision forecloses many applications and results in operating difficulty in others.

Many prior art arrangements have complicated and expensive mounting features because of the construction of the devices whereas devices within the scope of the present invention have easily connected mounting means and are easily installed.

SUMMARY OF THE INVENTION

The present invention provides highly effective, precise and efficient multimotion actuator devices to provide both linear and rotary output capabilities either simultaneously or sequentially. Devices within the scope of the present invention are straightforward in design and inexpensive to manufacture and operate.

Moreover, devices within the scope of the present invention provide precise movement and positioning without backlash or lost motion so they are particularly useful in applications where it is important to be able to closely control movement of an actuator shaft and any equipment carried by the shaft.

Construction of devices within the scope of the present invention allows the use of guides which can be adapted to eliminate the need for lubrication in some applications and allow operation at speeds not obtainable with prior art devices. Also the unique construction provided by devices within the scope of the present invention allows support for the rotary and linear shafts throughout their travel so that orbiting and deflection are prevented to further improve the precision of devices within the scope of the present invention.

Various rotary actuators, including vane type rotary actuators can be used in devices within the scope of the present invention contrary to known multimotion devices which have used only actuators of the piston type where piston motion is converted to rotary motion. The use of vane actuators advantageously eliminates the liklehood of backlash or lost motion in the generation of the rotary action.

Devices within the scope of the present invention are easily and economically adapted to receive fully and independently adjustable travel indicators for linear and rotary travel such as limit switches. Because of the construction provided by the present invention the travel indicators can be easily reset when necessary due to changing needs and circumstances. Additionally, rotary and linear travel stops and bumpers are easily provided in devices in accordance with the present invention.

Briefly, the present invention provides a multi directional actuator capable of moving a shaft in at least two directions independently including one linear and one rotary movement. A base plate is provided to receive a first actuator having a linearly moving shaft which is extended from and retracted into the actuator. A second actuator is connected for movement by the first actuator and where the second actuator operates an output shaft which is selectively rotated through a portion of an arc. A guide arrangement is provided to direct movement of the second actuator by the first actuator and to journal the shaft of the second actuator to prevent orbiting and deflection of the shaft of the second actuator. Limit switches can be provided to indicate end of the stroke of the linear actuator and the first and second actuators can be separated to allow use of limit stops to limit rotation of the shaft of the second actuator.

Examples of devices in accordance with the present invention are shown in the accompanying drawings and described hereinafter but it will be understood that the illustrations and discussions related thereto provided hereinafter are by way of illustration only, not by way of limitation and that other arrangements also within the scope of the present invention will occur to those skilled in the art upon reading the disclosure set forth hereinafter.

BRIEF DESCRIPTION OF THE DRAWINGS

Referring now to the accompanying Figures which illustrate examples of arrangements within the scope of the present invention.

DETAILED DESCRIPTION OF THE DRAWINGS

Figure 1:
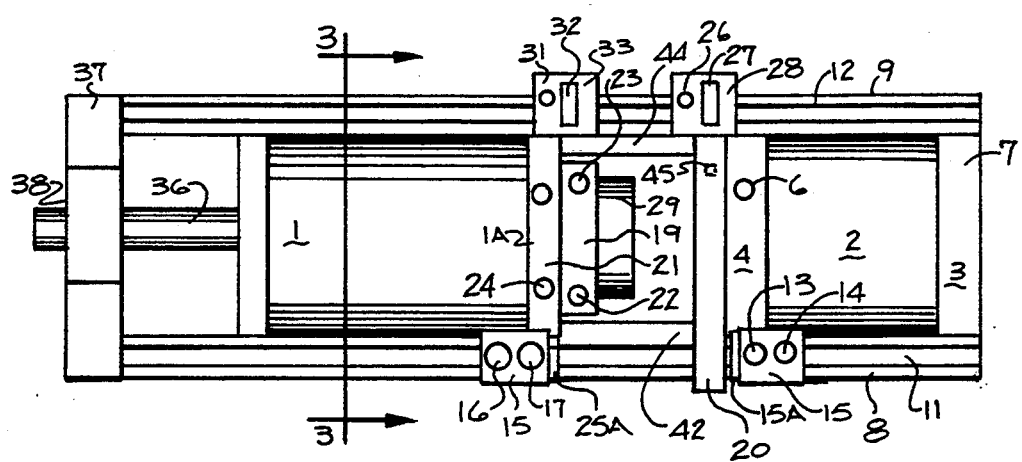
FIG. 1 is a top elevational view of one example of a device within the scope of the present invention with the linear shaft of the linear actuator retracted.

Referring now to FIG. 1 which illustrates one example of a device within the scope of the present invention, which includes an end member 37 connected to a base member 3 by means of side rail/guides 9 and 8 respectively.

A linear actuator 2, for example of the piston type, is provided, as shown, and in the example shown the base member 3 is also the closed head of the actuator.

The opposite head 4 of the actuator is located on the opposite side of the body of the cylinder as also shown so that the actuator is retained within the siderail/guides 8 and 9 and the actuator shaft, as described hereinafter is in general alignment with the longitudinal axis of the center of the guide rails/guides.

As also shown a stop bar 20 is provided adjacent head 4 and is used in conjunction with stop means as described hereinafter to limit travel of the shaft of actuator 2 within selected travel areas. In FIG. 1 stops 15 and 25 are shown and secured in slot 11 of side rail/guide 8 as shown by bolts 13, 14 and 16, 17 as shown. The stops can be independently moved to limit the linear travel as described hereinafter.

Also within the scope of the present invention, limit switches can be utilized to indicate the location of the linear shaft at selected locations. Within the scope of the present invention the limit switches can be mechanical or electrical and in the illustration shown in FIG. 1 electrical limit switches 27 and 32 are provided. The switches can be actuated by various means and in the example shown magnetically actuated switches such as reed switches or Hall Effect switches can be used. The switches are carried by plates 28,33 respectively which are releasably secured to side rail/guide 9 by means of "T" bolts 26,31 received in slot 12 of the side rail/guide. The switches are actuated by any convenient means and in the example shown are actuated by a magnet 45 imbedded in stop plate 20. The plates 28,33 can be independently located along the travel path of stop 20 to indicate any desired location of the stop plate but are usually located to indicate the presence of the stop plate at the ends of travel.

The shaft within actuator 2 is extended by the application of fluid pressure at one of the ports 6,7 located in the heads 4,3 respectively and retracted by the application of fluid pressure at the other port as is known in the art.

In accordance with another feature of the present invention, a rotary actuator 1 is provided with an output shaft 36 which is rotated in one direction by the application of fluid at one of the ports 18,24 located in the head 1A and in an opposite direction by application of fluid pressure at the other port as is known in the art. The actuator shown is a vane actuator as shown in more detail in FIG. 3 but it will be understood that within the scope of the present invention other types of actuators are equally useful.

The present invention provides the capability to easily locate rotary position indicating means such as limit switches to indicate the location of the rotary shaft at various locations in its arc of travel. Usually such devices are used to indicate the presence of the shaft at the ends of stroke. In FIG. 1 a rotary switch package 29 is provided and adapted to receive the end of the shaft (not shown) of actuator 1. Devices within the scope of the present invention can also be easily adapted to receive a stop package 19 such as the one illustrated in FIG. 1 where the actuator shaft extends through the stop package 19 and includes a cam (not shown) to limit rotation of the shaft between positions selected by adjustment of stop screws 23 and 22.

Figure 3:
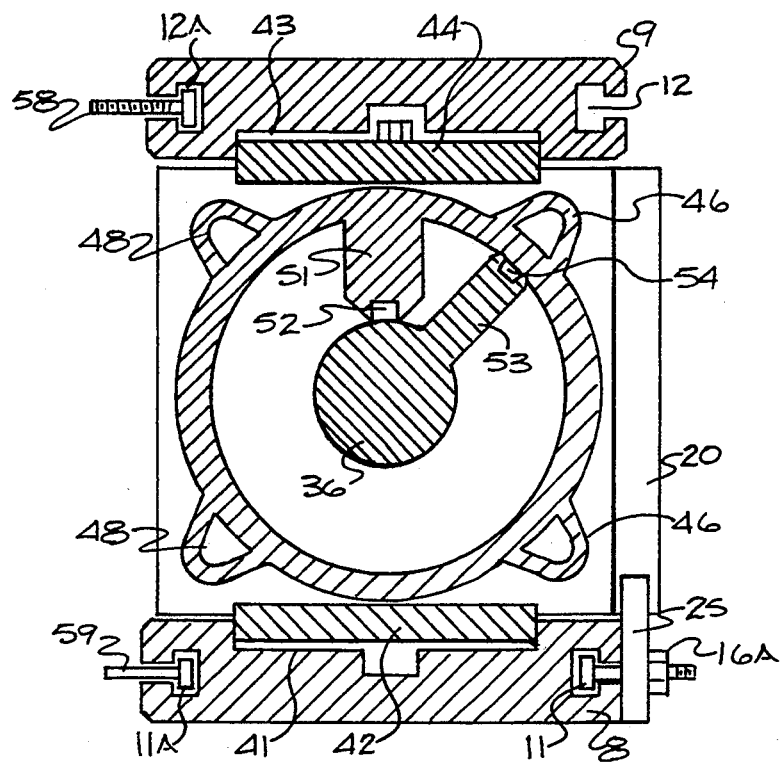

In the arrangement shown glide bars are provided and connected to the linear actuator 2 and the rotary actuator 1. The glide bars are received in guide slots in the side rail/guide as illustrated in FIG. 3.

As also shown in FIG. 1 the head 37 can be connected to the side rail/guides 9 and 8. In accordance with one feature of the present invention, a journal 38 is provided in the head and receives shaft 36 to guide the shaft for both rotary and linear motion to prevent deflection and/or orbiting of the shaft.

Figure 2:
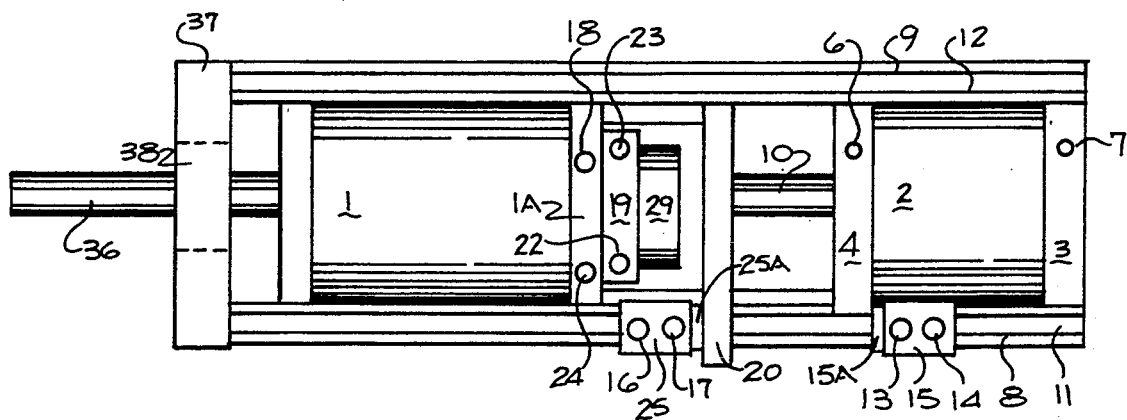
FIG. 2 is a view of the device shown in FIG. 1 with the linear shaft of the linear actuator extended so the rotary actuator is moved relative to the linear actuator.

FIG. 2 is an illustration of the device shown in FIG. 1 where the linear actuator 2 is fixed and the actuator has been actuated so shaft 10 extends outwardly from the actuator and can be subsequently retracted into the actuator to extend and retract the shaft 36 of rotary actuator 1 with respect to the head 37.

In the arrangement shown in FIG. 2, the shaft 10 of linear actuator 2 is connected to the stop plate 20. FIG. 2 illustrates the function of the stops 25 and 15. In FIG. 1 shaft 10 is withdrawn into actuator 2 and stop plate 20 engages stop 15. In FIG. 2, shaft 10 is extended from actuator 2 but only so far as required to engage stop 25.

In FIG. 1 the stops 15 and 25 are shown to include bumpers 15A and 25A. The bumpers are provided to soften the engagement of the stop plate and the stops to minimize the impact of the stop plate and stop and minimize any shock which may occur to the rotary actuator 1 and to any device which may be located on the end of shaft 36.

Figure 2A:
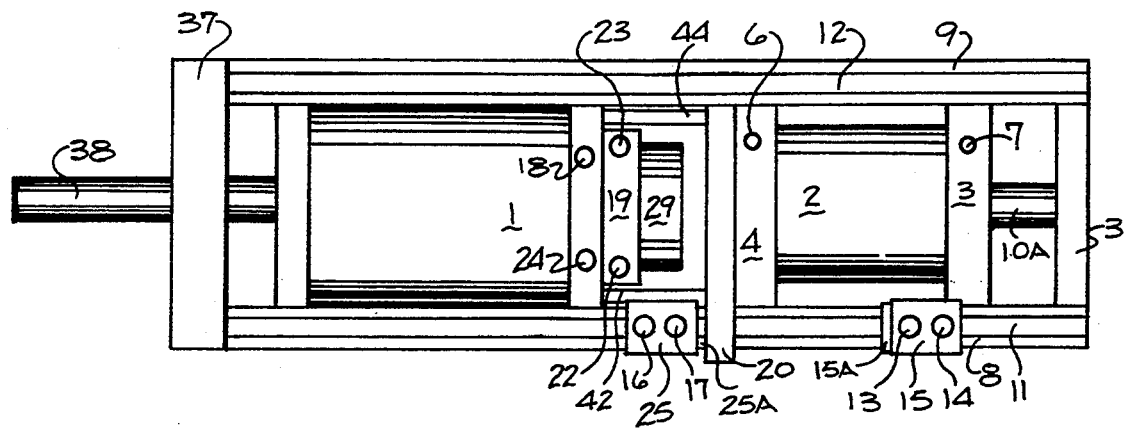
FIG. 2A is a view of an example of a device in accordance with the present invention with the shaft of the linear actuator extended so that the linear and rotary actuators move together relative to the base of the assembly; and, FIG. 3 is a view taken along a plane passing through line 3—3 of FIG. 1.

FIG. 2A illustrates another arrangement within the scope of the present invention where instead of the shaft 10 moving outwardly to engage the stop plate 20 the shaft 10A of linear actuator 2 engages a base plate 3A and the linear and rotary actuators are both moved by extension and retraction of the shaft 10A.

In FIG. 2 the actuator 1 and in FIG. 2A the actuators 1 and 2 are connected to glide bars 42 and 44 as shown in FIG. 3 and move in glides described hereinafter in the side rail/guides 9 and 8. The use of the side rail/glides 9 and 8 provides several significant advantages. First, movement of the actuator(s) is true and precise. The travel path is uniform from traverse to traverse and of utmost importance is the fact that the movement is supported throughout the entire travel path.

In the example shown in FIG. 2 the glide bars 42 and 44 as illustrated in FIG. 3 are connected to actuator 1 while in the example shown in FIG. 2A the glide bars are connected to actuator 1 and to at least one of the heads of actuator 2.

FIG. 3 is a view taken along a plane passing through line 3—3 of FIG. 1 illustrating the crossection of one example of an actuator useful in operation of a device within the scope of the present invention. While a fluid operated rotary vane actuator is illustrated it will be understood that other actuators such as piston operated fluid powered actuators as well as electric actuators can also be utilized in devices within the scope of the present invention.

In the example of FIG. 3, the actuator includes a stop 51 located in the actuator housing having a lip seal 52 adapted to seal on shaft 36. Also shaft 36 includes a vane 53 having a lip seal 54 which engages the inner surface of the housing so that by adding and removing fluid in the chambers defined on opposite sides of the vane 53 the shaft 36 is rotated back and forth in the housing and provides rotary output motion as previously described.

While any convenient means can be used to secure the actuator to the actuator heads in the example of FIG. 3 the housing includes lobes 46 which receive bolts 48 which extend from the upper head to the lower head to secure the housing therebetween.

FIG. 3 also illustrates the shape of the side rail/guides 9 and 8 and the construction of one example of a device within the scope of the present invention.

As illustrated, the side rail/guides have glide grooves 41, 43 respectively to receive the glides 42 and 44 as illustrated to guide movement of the actuator 1.

The side rails/guides also have "T" slots at each edge, as shown, for connecting accessories and mounting the assembly. Specifically, in FIG. 3, the stop plate 25 as previously discussed with reference to FIG. 1 is retained on the side of the side rail/guide 8 so the positioning can be adjusted from time to time. In this regard a "T" bolt 16 is received in the "T" slot and receives a nut 16a to hold the stop plate in position yet allow easy adjustment of the position.

As previously discussed, the arrangement shown provides means for easy adjustment of any accessory devices which may be desired for the operation of the assembly including, but not limited to, the switch packages 28,33 also illustrated in FIG. 1.

Additionally, the "T" slots allow a unique mounting arrangement as also illustrated in FIG. 3 where "T" bolts 58 and 59 are provided to allow the entire assembly to be easily mounted to an adjacent support (not shown ). By the arrangement shown it is not necessary to build in the mounting configuration during the manufacturing operation and the number of mounting points and their location can be be field selected to accommodate the particular application.

FIG. 3 also illustrates one means for connection the glides 42 and 44 to the actuators and heads as required. As shown the actuator head can be keyed and adapted to receive a portion of the glides 42 and 44 where the other portion of the glides are received in the glide grooves 41 and 43 of the side rail/guides. In the example shown, the glide rail 44 is secured to the head of actuator 1 by means of a bolt 44A and similar mounting arrangement can be provided for the rail 42.

It will be understood that the foregoing is but one example of an arrangement within the scope of the present invention and that other arrangements also within the scope of the present invention will occur to those skilled in the art upon reading the foregoing disclosure.

The invention claimed is:

1. A multi directional actuator capable of moving an output shaft independently in linear and rotary movement including:

base means, first actuator means having a linearly moving linear shaft which is extended from and retracted into said first actuator means; second actuator means connected for movement by said first actuator means where said second actuator means operates a rotary output shaft which is selectively rotated through a portion of an arc; guide means connected to said base means to direct relative linear movement of said second actuator means by said first actuator means; end means carried by said guide means to journal said output shaft of said second actuator means to prevent orbiting and deflection of said output shaft of said second actuator.

2. The invention of claim 1 wherein said first and second actuator means are in axially aligned relation relative to the direction of linear movement of the shaft of said linear actuator.

3. The invention of claim 2 including side rail means adjacent said first and second actuator means.

4. The invention of claim 3 wherein said side rail means provides guide means to direct movement of said second actuator by said first actuator.

5. The invention of claim 2 wherein said side rail carries said end means to journal said output shaft means.

6. The invention of claim 4 wherein said side rail means includes at least two rail members located on opposite sides of said first and second actuator means.

7. The invention of claim 6 wherein said side rail means include longitudinally extending groove means and wherein glide means are carried by said second actuator received in said side rail groove means to guide said second actuator means in a linear direction as said first actuator shaft is extended and retracted.

8. The invention of claim 4 wherein said linearly extending shaft of said first actuator is connected to said second actuator and moves said second actuator directly in said guide means.

9. The invention of claim 4 wherein said linearly extending shaft of said first actuator is connected to shaft base means carried by said side rail means and said first and second actuators are connected for simultaneous movement along said side rail means.

10. The invention of claim 7 including stop means selectively located along said side rail means and stop engaging means carried for linear movement with said second actutator means to limit the movement of said second actuator along said side rail means.

11. The invention of claim 1 wherein said rail means are elongate and with at least two opposite edges and have uniform cross-sectional configuration along the length thereof including groove means to receive said guide means and "T" shape groove means extending along at least a portion of the edge thereof and bolt means having "T" shaped heads adapted to be received therein to be attached to selected accessory articles.

12. The invention of claim 11 including limit switch means to indicate when said linear extending shaft has reached the end of a stroke of said linear actuator.

13. The invention of claim 11 including limit switch means to indicate the when the shaft of said second actuator has reached an end of a stroke of said second actuator shaft.

* * * * *